United States Patent [19]

Manico

[11] Patent Number: 5,436,738
[45] Date of Patent: Jul. 25, 1995

[54] THREE DIMENSIONAL THERMAL INTERNEGATIVE PHOTOGRAPHIC PRINTING APPARATUS AND METHOD

[75] Inventor: Joseph A. Manico, Rochester, N.Y.

[73] Assignee: Eastman Kodak Company, Rochester, N.Y.

[21] Appl. No.: 824,824

[22] Filed: Jan. 22, 1992

[51] Int. Cl.⁶ .................. H04N 1/23; H04N 1/387; H04N 1/393; H04N 1/50; G03B 27/32; G03B 35/00

[52] U.S. Cl. ..................... 358/503; 358/530; 358/448; 358/450; 358/296; 355/22; 355/55; 359/458; 359/463

[58] Field of Search ............... 355/22, 55; 352/43, 352/61; 353/7, 10; 358/3, 296, 75, 503, 450, 453, 448, 530; 359/458, 462, 455, 463, 478; 354/112, 114, 15

[56] References Cited

U.S. PATENT DOCUMENTS

| | | | |
|---|---|---|---|
| 3,898,086 | 8/1975 | Franer et al. | 250/318 |
| 4,430,668 | 2/1984 | Miles | 358/75 |
| 4,478,639 | 10/1984 | Smith et al. | 355/22 |
| 4,547,784 | 10/1985 | Erlichman et al. | 346/76 PH |
| 4,631,580 | 12/1986 | Taube et al. | 348/47 |
| 4,757,350 | 7/1988 | Street | 355/22 |
| 4,915,519 | 4/1990 | Afzali-Ardakani et al. | 346/76 PH |
| 4,956,705 | 9/1990 | Wright | 348/50 |

OTHER PUBLICATIONS

Three Dimensional Imaging Techniques by Takanori Okoshi Academic Press 1976, pp. 60-123.

*Primary Examiner*—Scott A. Rogers
*Attorney, Agent, or Firm*—Edward Dugas

[57] ABSTRACT

The present invention is a system and method that produces an internegative 60 from a digitally processed image or images that are originally captured on film or digitally. The digital processing by a computer 58 allows digital operations to be performed such as filtering, image overlay and stereo image creation. The internegative 60 is reduction printed using an enlarger apparatus 70 and developed, thereby increasing the resolution of the printed image. A lenticular cover can be attached to a stereo picture produced in this way to mass produce a high angular resolution, three dimensional photograph 8. The internegative can also be enlarged allowing digital processing to be applied to poster and billboard type images.

11 Claims, 3 Drawing Sheets

THREE DIMENSIONAL THERMAL INTERNEGATIVE PHOTOGRAPHIC PRINTING APPARATUS AND METHOD

CROSS REFERENCE TO RELATED APPLICATION

This application is related to U.S. application Ser. No. 07/631,708 entitled Generation Of Hard Copy Color Photo Reproductions From Digitally Created Internegative by Manico et al., assigned to Eastman Kodak Co., having Kodak docket no. 60,055 and concurrently filed U.S. application entitled Method of Modifying a Time-Varying Image Sequence by Estimation of Velocity Vector Fields by Sergei V. Fogel having Kodak docket no. 61,796, both incorporated by reference herein.

BACKGROUND OF THE INVENTION

1. Field of the Invention

The present invention is directed to providing high resolution three dimensional photographic prints and, more particularly, to providing high resolution prints from thermally printed internegatives where the prints can be converted into three dimensional lenticular photographs.

2. Description of the Related Art

Three dimensional pictures or photographic prints sometimes called lens sheet three dimensional pictures or lenticular sheet three dimensional pictures conventionally are limited in the number of discreet images that can be captured and presented. The quality of a three dimensional photographic print, as the print view point shifts, is governed by the number of discreet images that can be printed. That is, as the picture is rotated with respect to the picture viewpoint, the higher number images that are successively provided, the smoother and more realistic the image appears to be. The rotational resolution depends on the number of images. For example, when the print has two images taken from two view points a sudden shift between the images occurs as the print is rotated and the viewpoint shifts. If twenty images are provided in the same angular rotation from twenty slightly different viewpoints, the transitions between images are very small and the composite image seems more lifelike. As a result, high angular resolution three dimensional images are desired.

In non-digital three dimensional images, the resolution is limited by the number of lenses or discreet exposures used to generate the three dimensional photograph. When three dimensional digital images are printed, the quality or angular resolution is limited by the resolution of the digital printer. With digital techniques, the number of images that can be interpolated from two or more original images can be as large as desired. However, because of the resolution limitations of conventional printers, the number of images that can be printed and the angular resolution possible is limited. For example, a digital three dimensional image with 12 discreet image components designed for use with a transparent, lenticular cover sheet with 42 lenticals per inch requires a color print with a resolution of 504 dots per inch. Typical low cost digital color printing technologies currently are limited to 200-300 dots per inch (DPI) for color thermal printers, such as the Kodak XL-7700, and 400 DPI for color xerographic printers, such as the Canon CLC-500 printer. As can be seen conventional low cost color printers cannot produce three dimensional images with 12 or more image components. Finer lenticular materials (more lenticals per inch) have less noticeable vertical striations and produce even more realistic three dimensional images, but require even higher print resolutions and would require digital images with more discreet image components. Printers that provide up to 610 dots per inch (DPI) resolution using photographic paper and 1524 DPI using photographic film are available, such as the digital image recorder LVT 1620B available from Light Valve Technology a Kodak subsidiary, but these printers are very expensive. What is needed is a method of using lower cost, low to medium resolution digital printers to produce three dimensional images with a high number of image components, thereby producing a high quality three dimensional image.

SUMMARY OF THE INVENTION

It is an object of the present invention to provide high resolution prints from digital images using a low cost, low to medium resolution digital printer.

It is another object of the present invention to provide high angular resolution three dimensional images using such printers.

It is a further object of the present invention to provide an apparatus and method to print multiple three dimensional image components that have been optically or digitally increased in number where the prints are generated without the need for a high resolution printer.

It is also an object of the present invention to provide a system which will allow multiple digital three dimensional image resolutions, multiple formats and multiple image components.

It is still another object of the present invention to allow a high volume of multiple image component, three dimensional images to be generated by optical/photographic means allowing large volumes of identical prints to be produced less expensively, more efficiently and faster because of the throughput rates of optical/photographic processes.

The above objects can be attained by a system and method that produces an internegative from a digital image or images. The negative is reduction printed using an enlarger apparatus and developed, thereby increasing the resolution of the printed image. A lenticular cover sheet is attached to a lenticular picture produced in this way to produce a three dimensional photograph.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
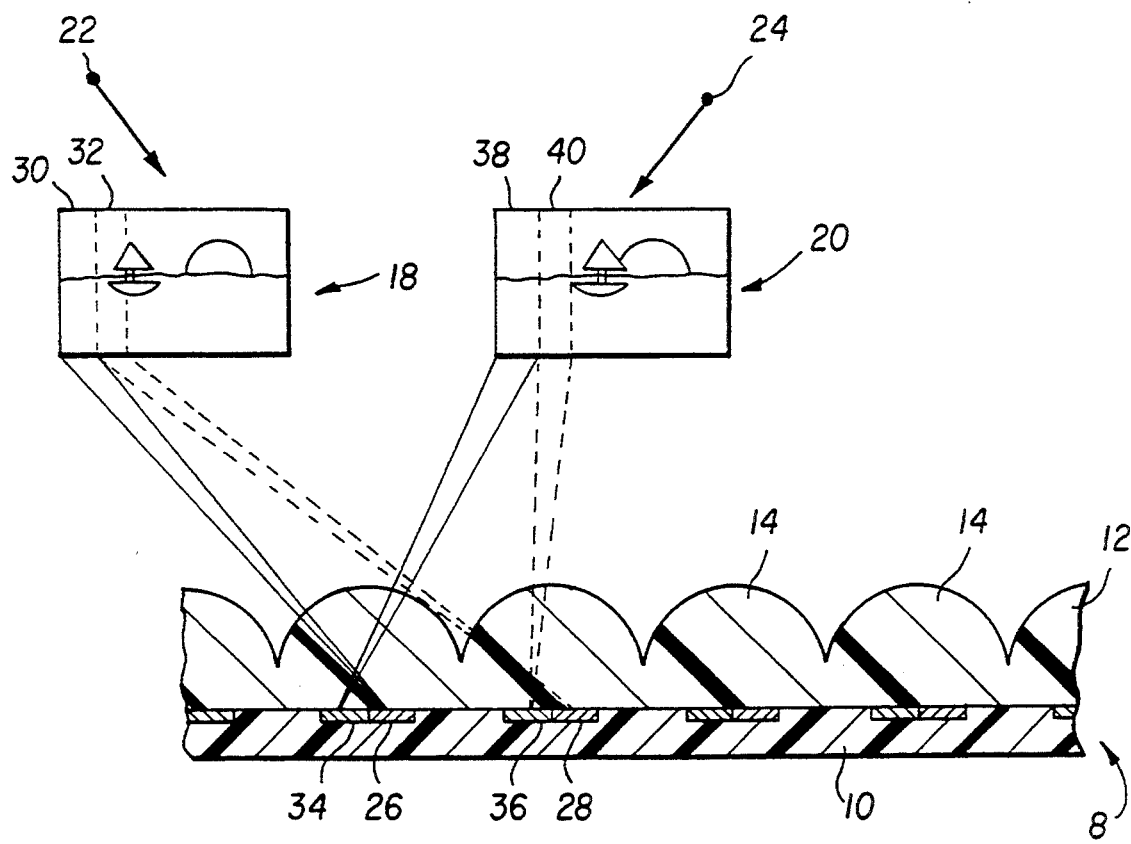
FIG. 1 illustrates the principles of a three dimensional photograph 8.

A three dimensional lenticular photograph and the principles behind the operation of such a photograph are illustrated in FIG. 1. A lenticular three dimensional photograph 8 includes a photographic print 10 and a transparent lenticular cover sheet 12 which generally includes half cylindrical focusing elements 14. The print 10 includes striped image components oriented in parallel with the half cylindrical lens element 14. The lens components 14 focus these image component stripes in a preferred point of view direction creating images 18 and 20 that appear different from different viewpoints 22 and 24. For example, the striped image components 26 and 28 combine to create portions 30 and 32 of the image 18 from the viewpoint 22. While image components 34 and 36 combine to produce image portions 38 and 40 of image 20 from viewpoint 24. FIG. 1 illustrates that the images 18 and 20 provide different perspectives of the same scene. That is, pictures 18 and 20 illustrate the same scene from different viewpoints giving the appearance of a three dimensional image in which the viewer can look behind objects in the photograph 8. As the number of image components positioned under each lens element 14 increases, the number of discreet images which are produced from different viewpoints also increases.

Figure 2:
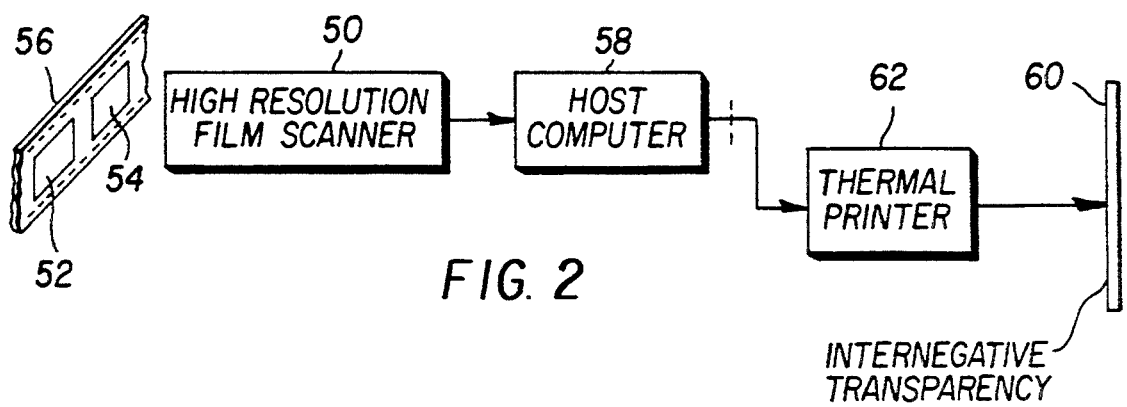
FIG. 2 depicts the apparatus for producing a thermal internegative transparency 60 in accordance with the present invention.

As illustrated in FIG. 2, the present invention uses a high resolution film scanner 50 to digitize two or more original images 52 and 54 on a film strip 56 and the digital images are stored in a host computer 58. The original images 52 and 54 can be captured on the film strip 56 by a stereo Camera or a non-stereo camera placed in two different locations. For example, a multilens camera or a step sequence camera can be used. The two or more digital images can also be produced using a conventional high resolution digital camera (not shown) rather than a conventional film camera. The host computer 58 can perform various image processing operations on the images, such as edge enhancement color correction, filtering and image combination. If a stereo photograph is to be produced the computer 58 also performs conventional processing on the images 52 and 54, such as described in Three Dimensional Imaging Techniques by Takanori Okoshi Academic Press 1976 incorporated by reference herein, to create a lenticular image. Such processing can include mirroring to correct for emulsion orientation, inverting to produce a negative image and contrast adjustment to conform to the printing requirements of the photographic paper. The host computer 58 can also interpolate a plurality of discreet digital images from the two or more original images 52 and 54 using techniques such as that described in Method of Modifying a Time-Varying Image Sequence by Estimation of Velocity Vector Fields by Sergei V. Fogel previously mentioned. The host computer 58 can then print those images on an internegative transparency 60, such as the Kodak Ektatherm transparency media, using a thermal printer 62 such as the Kodak XL-7700 thermal printer. That is, the host computer 58 can produce each of the original and/or created discrete images separately as internegative transparencies without creating a lenticular internegative transparency. The Kodak thermal printer mentioned above has a print resolution of 200 DPI and a total printing area of 10.08 inches by 10.08 inches. If host computer 58 has created an image suitable for a lenticular print, the host 58 can use the printer to produce an internegative transparency. The process and Apparatus for producing an internegative transparency 60 as discussed above, are discussed in detail in the related Generation Of Hard Copy Color Photo Reproductions From Digitally Created Internegative application previously mentioned.

Figure 3:
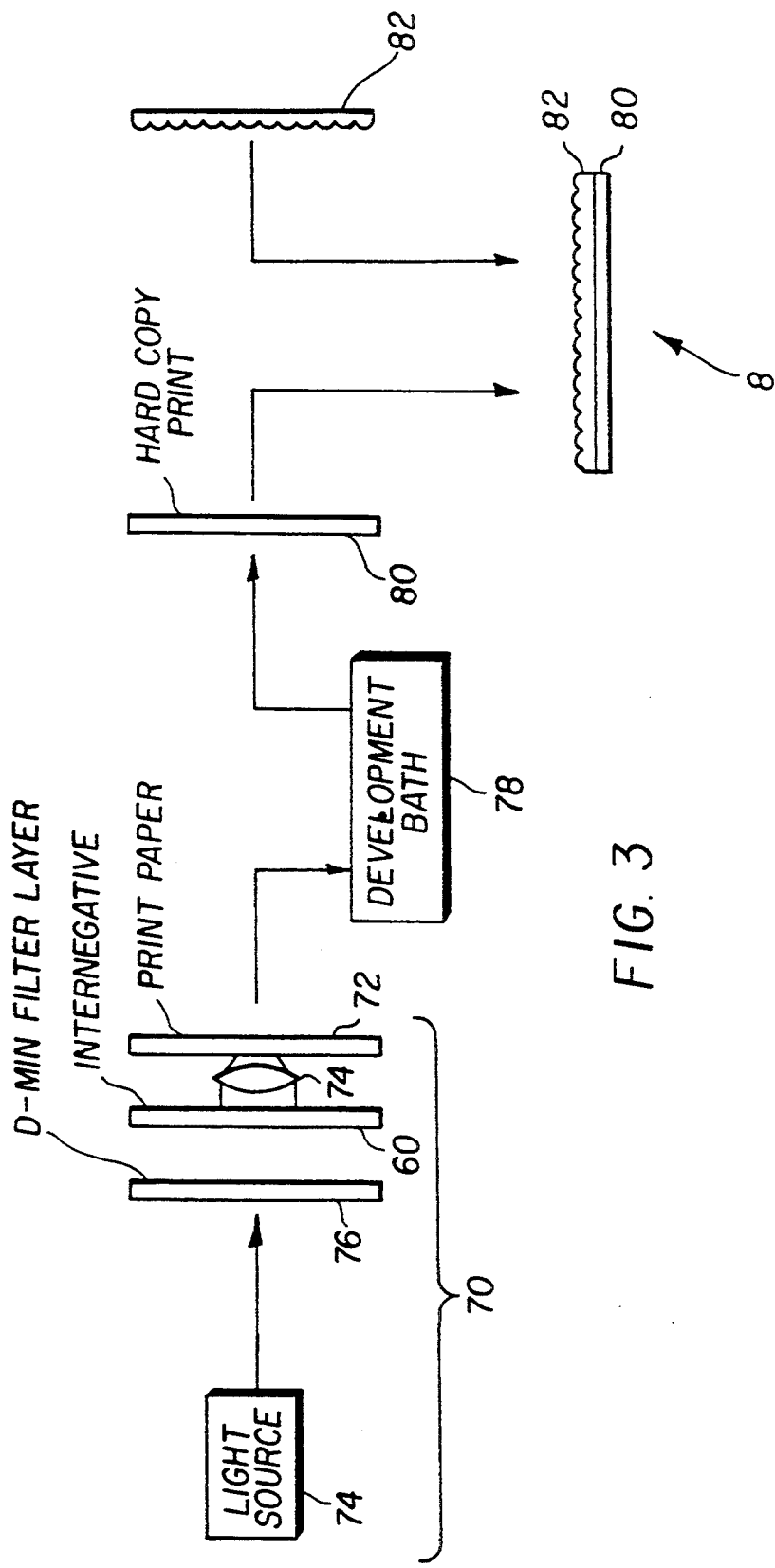
FIG. 3 illustrates how a three dimensional multi-image component high angular resolution three dimensional print 8 is produced in accordance with the present invention.

Once the large format thermal internegative 60 is produced, a conventional enlarger 70 as illustrated in FIG. 3 can be used to produce a three dimensional print 72. In this operation a light source 74 through an optional filter 76 radiates filtered light through the internegative 60 and a reduction lens 74 onto the conventional photographic print paper 72. That is, the image magnification is less than 1.0 resulting in a reduction of the image. By reducing the image using lens 74 the effective resolution of the image on the print paper 72 is increased as compared to the image resolution of the internegative 60. A conventional large format negative enlarger with reduction capability, such as the Super Chromega 8×10 Enlarger available from Omega is a suitable apparatus 70. The exposed print paper is conventionally developed in a development bath 78 to produce a hardcopy print 80 using a conventional color photographic printer apparatus. The hardcopy print, if the print is not a lenticular print can then be distributed as a high resolution print of the original image. That is, the present invention allows powerful digital image processing techniques to be applied to digitized images and still produce high resolution prints using a digital printer. Such prints can have a much higher resolution than the image on the internegative 60 as well as higher than the original image. However, if the print 80 is a lenticular print, a conventional lenticular cover sheet 82 is conventionally attached to the print using, for example, a rolling contact adhesion device and method or a frame that holds both the print and the cover sheet to produce the lenticular sheet three dimensional photograph 8. It is also possible to use the enlarger 70 to enlarge or magnify the image on the internegative 60 to produce large images such as billboards or posters. That is, the present invention allows digital processing techniques, such as overlaying words, to be applied to photographs used in a large image display.

Figure 4:
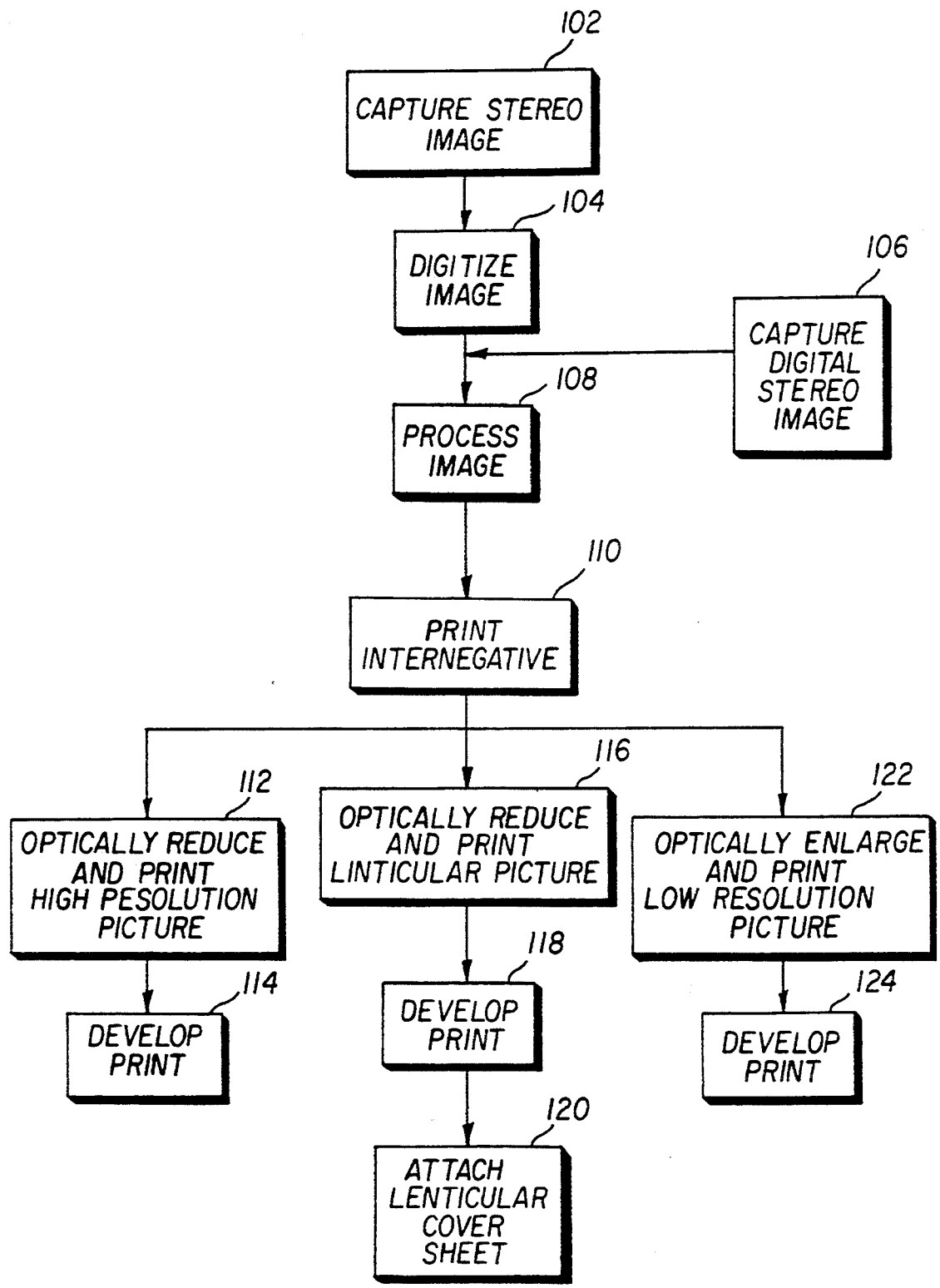
FIG. 4 is a flowchart illustrating the steps of a process 100 performed in accordance with the present invention.

The steps in the process previously discussed are illustrated in the FIG. 4 flowchart. The method as previously discussed captures 102 a stereo image and digitizes 104 that image. Alternately, the method digitally captures 106 the stereo image. Of course, as previously discussed, a non-stereo image can be captured and a high resolution non-stereo print produced. Once the images have been digitized, they are processed 108 using the techniques previously discussed and used to print 110 the transparency internegative 60. The image from the internegative is then optically reduced and printed 112 producing a high resolution picture which is then developed 114. The steps 112 and 114 can be performed on a mass production basis. Alternately the internegative of a lenticular stereo image is optically reduced and printed 116 to produce a lenticular picture. The picture is then developed 118 and the lenticular cover sheet is attached 120. Steps 116, 118 and 120 can be used to mass produce stereo pictures at low cost. Further, the system can optically enlarge the image and print 122 a low resolution picture is then developed. Once again mass production is possible.

In accordance with the present invention, a digital image with 12 discreet three dimensional images can be generated as a 10 inch by 10 inch thermal internegative with a resolution of 200 data per inch (DPI). The lenticular resolution of such a thermal internegative is calculated in accordance with equation (1):

$$LR = PR/N \qquad (1)$$

where LR is the lenticular resolution of the thermal internegative, PR is the printer resolution for the thermal internegative and N is the number of three dimensional images. For the 10 inch by 10 inch thermal internegative example mentioned above, the lenticular resolution is 16.7 lenticals per inch as shown by equation 2:

$$LR = 16.7 \text{ lenticals per inch} = 200 \text{ DPI}/12 \text{ images} \qquad (2)$$

If the required lenticular resolution is known, the magnification (actually a reduction since the magnification is less than 1.0) of the lens 74 in the enlarger 70 can be calculated in accordance with equation 3:

$$M = LR/RR \qquad (3)$$

where RR is the required lenticular resolution and M is the magnification. If a 42 lenticals per inch is the required resolution (RR) of the current 10 inch by 10 inch example, the magnification is 0.398 as illustrated by equation 4.

$$M = 0.398 = 16.7 \text{ lenticals per inch}/42 \text{ lenticals per inch} \qquad (4)$$

To determine the final print dimensions, equation 5 can be used:

$$S = D*M \qquad (5)$$

where D is one of the dimensions of the thermal internegative 60 and S is the corresponding dimension in the print 80. In accordance with equation 5, the height and width of the final print of a ten inch by ten inch thermal internegative are $$S = 3.98 \text{ inches} = 10 \text{ inches} * 0.398 \text{ (height)} \qquad (6)$$

$$S = 3.98 \text{ inches} = 10 \text{ inches} * 0.398 \text{ (width)} \qquad (7)$$

Using equations 1, 3 and 5 and the preferred thermal printer mentioned above a Resolution/Print Size Table can be produced as shown below from which the relationship between thermal internegative size, lenticular resolution and final print size of a desired print can be determined and used to guide the process of the present invention.

| Resolution/Print Size Table | | | | | | |
|---|---|---|---|---|---|---|
| XL-7700 MASTER NEG PIXELS | XL-7700 MASTER NEG INCHES | TOTAL 3D IMAGES | TOTAL LENTICALS | LENTICALS PER INCH | FINAL PRINT SIZE 42 LEN/IN | FINAL PRINT SIZE 53 LEN/IN |
| 2048 | 10.08 | 24 | 85.3 | 8.5 | 2.0 | 1.6 |
| 2048 | 10.08 | 16 | 128.0 | 12.8 | 3.0 | 2.4 |
| 2048 | 10.08 | 12 | 170.7 | 17.1 | 4.1 | 3.2 |
| 2048 | 10.08 | 8 | 256.0 | 25.6 | 6.1 | 4.8 |
| XL-7700 MASTER NEG PIXELS | XL-7700 MASTER NEG INCHES | TOTAL 3D IMAGES | REQUIRED RES (DPI) 42 LEN/IN | REQUIRED RES (DPI) 53 LEN/IN | REQUIRED MAG 42 LEN/IN | REQUIRED MAG 53 LEN/IN |
| 2048 | 10.08 | 24 | 1008 | 1272 | 0.20 | 0.16 |
| 2048 | 10.08 | 16 | 672 | 848 | 0.30 | 0.24 |
| 2048 | 10.08 | 12 | 504 | 636 | 0.40 | 0.32 |
| 2048 | 10.08 | 8 | 336 | 424 | 0.61 | 0.48 |

Once a thermal internegative, in accordance with the present invention, has been generated multiple three dimensional prints cain be generated allowing large volumes of identical prints to be produced as required in applications such as photographic business cards and greeting cards. The present invention allows stereo images, digitally processed high resolution prints and digitally processed low resolution prints to be produced less expensively, due to lower material costs, and more efficiently, due to faster throughput rates of the final optical/photographic process step.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for producing a three dimensional photograph, comprising:
   digital means for digitally processing at least two images to form a single stereo color image;
   digital color printing means for thermally, non-photographically, printing the stereo color image on a transparent material to form a color internegative of the stereo color image;
   means for reduction printing the stereo color image on photographic media to produce a photographic print by projecting light through the internegative onto the photographic media; and
   means for attaching a lenticular cover sheet to the print confronting the printed stereo image.

2. An apparatus as recited in claim 1, wherein said reduction means comprises an optical enlarger including a lens with a magnification of less than 1.0.

3. An apparatus for producing a three dimensional photograph, comprising:
   digital means for digitally processing at least two images to form a single stereo image, said digital means comprising extrapolation means for extrapolating images between the at least two images to improve perception of depth;

digital printing means for thermally, non-photographically, printing the stereo image on a transparent material to form an internegative of the stereo image;

means for reduction printing the stereo image using the internegative to produce a photographic print; and means for attaching a lenticular cover sheet to the print confronting the printed stereo image.

4. An apparatus for producing a three dimensional photograph, comprising:

a sensor capturing at least two images;

a computer connected to said sensor and digitally processing the at least two images into a single stereo color image;

a digital color printer connected to said computer for thermally, non-photographically, printing the stereo color image on a transparent material to form a color internegative of the stereo color image;

an enlarger for reduction printing the stereo color image from the internegative onto photographic print media by projecting light through the internegative onto the photographic print media; and means for associating a lenticular cover sheet with the print media confronting the printed stereo image.

5. An apparatus as recited in claim 4, wherein said means for associating attaches the lenticular cover sheet to the print media after printing.

6. An apparatus for producing a photograph, comprising:

digital color printing means for thermally, non-photographically, printing a single, color image on a transparent material to form a color internegative image of an original color image; and means for reduction printing the color internegative image onto a photographic print media by projecting light through the internegative onto the photographic print media to produce a photographic print.

7. An apparatus as recited in claim 6, wherein said digital color printing means comprises a thermal printer and said reduction print means comprises an enlarger.

8. An apparatus for producing a photograph, comprising:

digital color printing means for thermally, non-photographically, printing a single, color image on a transparent material to form a color internegative image of an original color image; and means for enlargement printing the color internegative image onto a photographic print media by projecting light through the internegative onto the photographic print media to produce a photographic print.

9. An apparatus as recited in claim 8, wherein said digital color printing means comprises a thermal printer and said enlargement print means comprises an enlarger.

10. A method of producing a three dimensional photograph, comprising:

(a) digitally processing at least two images to produce a single, stereo color image;

(b) thermally, non-photographically, printing the stereo color image on a transparent material to form a color internegative of the stereo color image;

(c) producing a photographic print of the stereo color image at a magnification of less than 1.0 by projecting light through the internegative onto photographic print media; and (d) associating a lenticular cover sheet with the print confronting the printed stereo color image.

11. A method as recited in claim 10, wherein step (d) includes attaching the lenticular cover sheet to the print after producing the print.

* * * * *